UNITED STATES PATENT OFFICE.

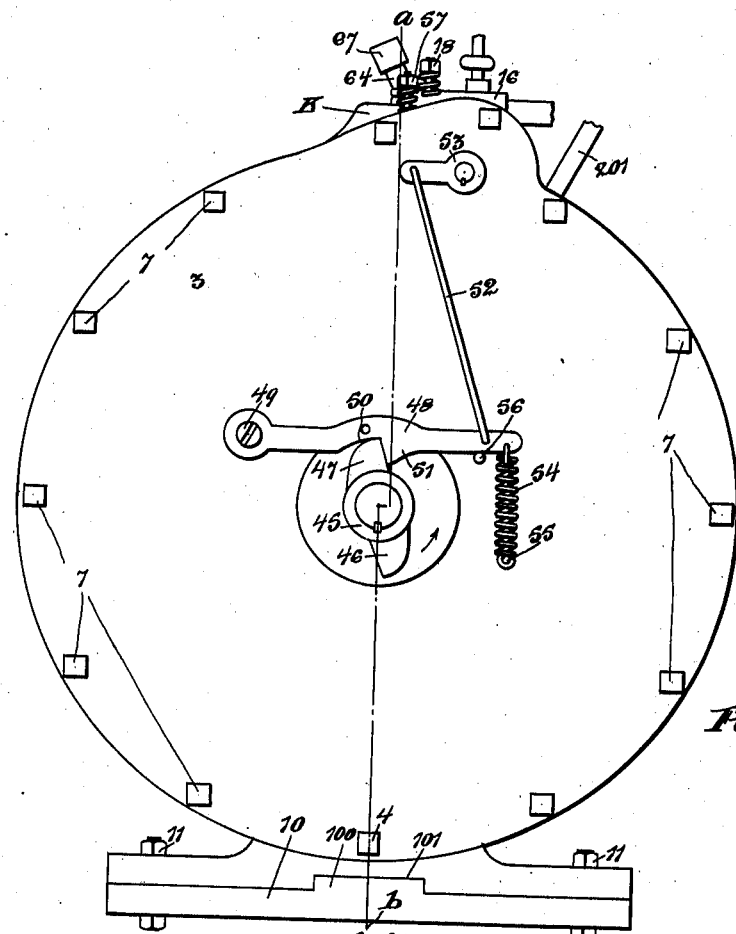
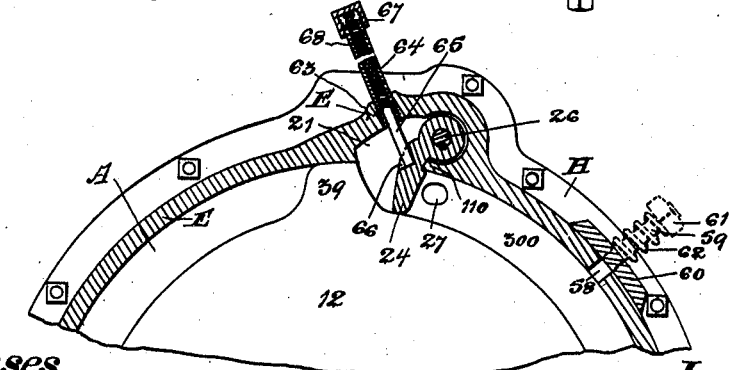

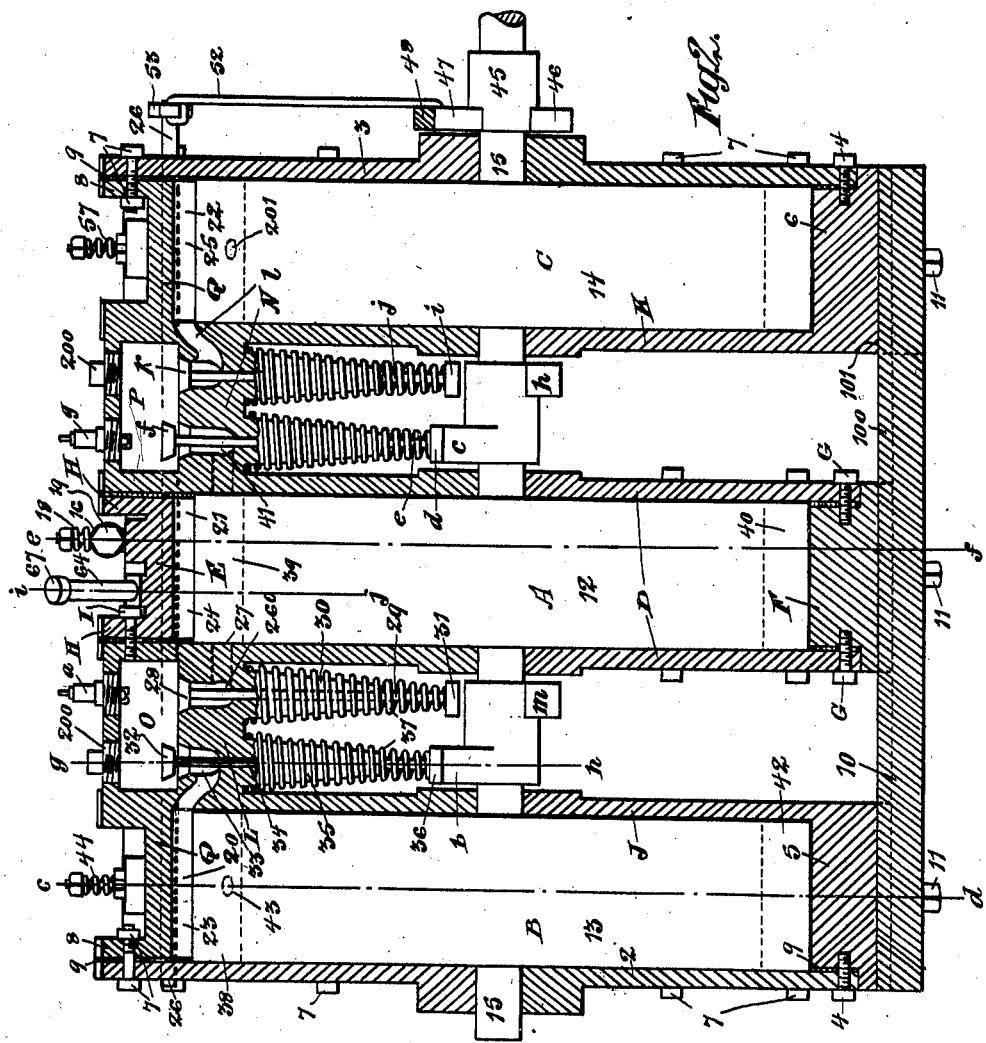

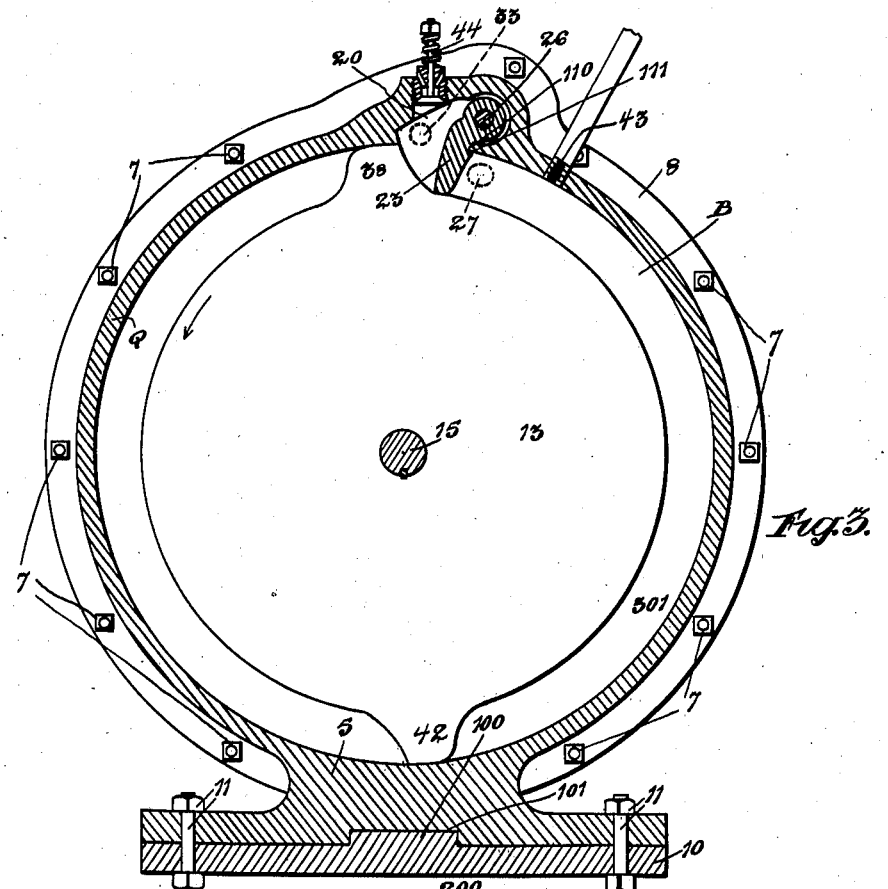
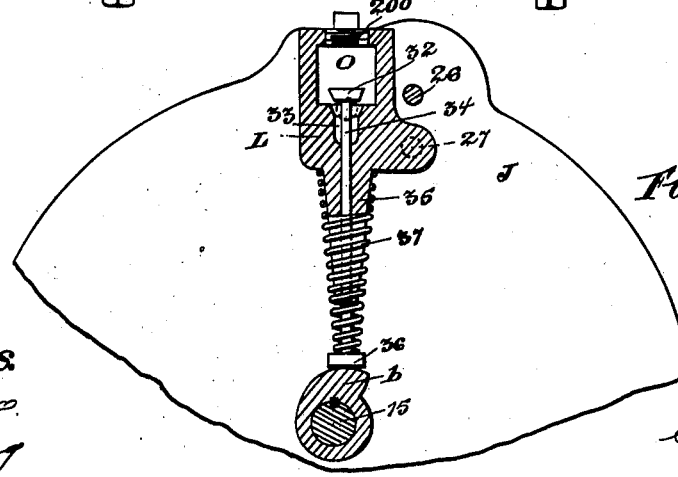

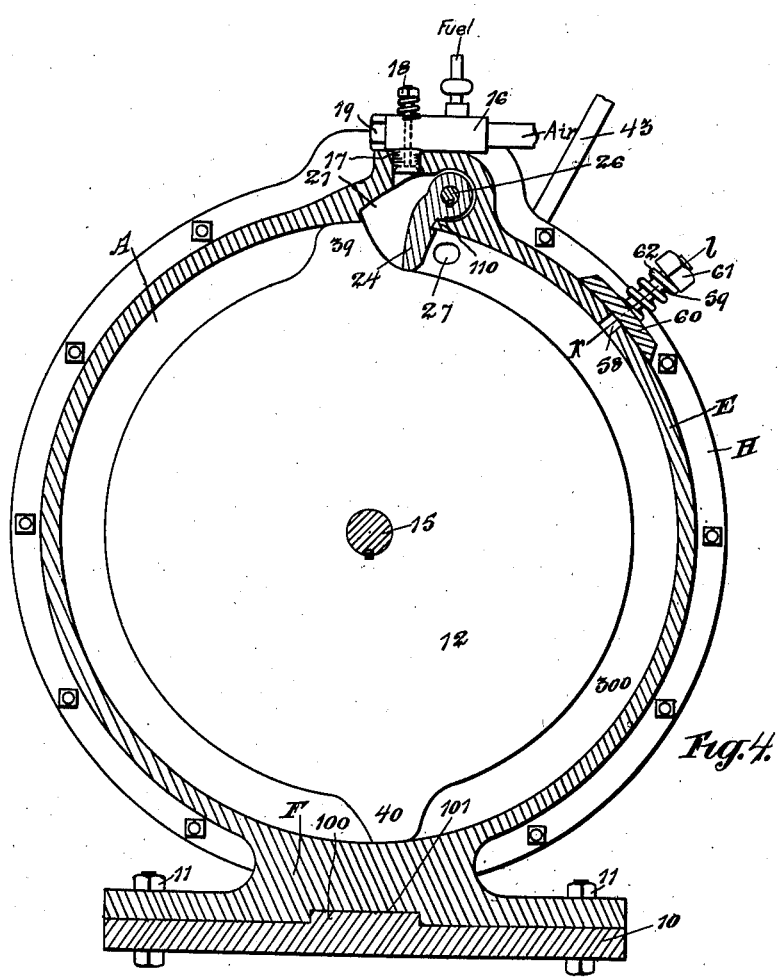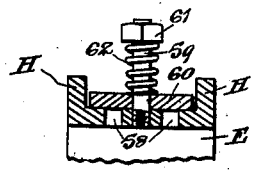

HAVELOCK HARFORD, OF ELBOW RIVER, ALBERTA, CANADA.

ROTARY ENGINE.

1,091,132. Specification of Letters Patent. Patented Mar. 24, 1914.

Application filed July 24, 1912. Serial No. 711,330.

*To all whom it may concern:*

Be it known that I, HAVELOCK HARFORD, a subject of the King of Great Britain, residing at Elbow River P. O., Alberta, Canada, have invented certain new and useful Improvements in Rotary Engines, of which the following is a specification.

My invention relates to improvements in rotary engines, and relates more particularly to the production of an engine of this class with which liquid fuels may be used, and in the following specification, and the drawings forming part thereof, I shall illustrate and describe the operation of my invention when liquid fuel is used.

One of the objects of my invention is to provide a rotary gas-engine, the power-developing cylinders of which receive the ignited gases alternately from compression-chests after the said gases have been mixed and compressed.

Another object of my invention is to design an engine of the class set forth wherein two impulses are had for each revolution of the pistons in the power-developing cylinders.

Another object of my invention is to dispose of the waste products of combustion freely, by each piston operating in the power-developing cylinders at the same time these pistons are receiving power from the fuel.

A still further object of my invention is to utilize an internal current of fresh air for cooling purposes in each power-developing cylinder.

A still further object of my invention, when the engine is in full operation, is to draw the charge; compress it; explode it; and dispose of the waste products of combustion, during one revolution of the pistons.

Further objects of my invention will be set forth in the following part of this specification.

When I adapt my engine for the consumption of liquid fuel, the same comprises a compression cylinder in which operates a piston; a power-developing cylinder also provided with a piston; a compression-chest functionally intermediate said cylinders, and connected by ports thereto; a shaft common to said pistons; valves controlling the passage of explosive mixture through said ports; means for operating said valves, and means whereby air is supplied to said power-developing cylinders and the explosive mixture supplied to said compression cylinders. The elements just described will only give me one impulse to each revolution of a piston in the power-developing cylinder, and therefore for the purpose of increasing efficiency, I prefer to combine with the elements already set forth a second power-developing cylinder with its piston, because I am enabled to get two impulses of the exploded explosive mixture to each revolution of said pistons. But I do not confine myself to necessarily using two power-developing cylinders.

Figure 1 is an elevation of one end of my engine, showing the cams and coacting levers for operating certain internal valves. Fig. 2 is a vertical longitudinal section on the line *a—b* Fig. 1, through the cylinders and compression-chests, certain parts of the valves in the compression-chests also being shown in section. Fig. 3 is a vertical transverse section on the line *c—d*, Fig. 2. Fig. 4 is a vertical transverse section on the line *e—f* Fig. 2. Fig. 5 is a vertical transverse section on the line *g—h* Fig. 2. Fig. 6 is a vertical transverse section on a line *i—j* Fig. 2. Fig. 7 is a transverse section on the line *k—l* Fig. 4.

In the drawings like characters of reference indicate corresponding parts in each figure.

In the embodiment of my invention illustrated, the engine consists of a compression-cylinder A, and two power-developing cylinders B and C one on each side thereof. The compression-cylinder A is composed of side walls D which are bolted or otherwise secured to the ring-plate E which is preferably integrally-formed with the base F.

G are cap-screws by means of which the side walls D are secured to the base F.

The ring-plate E is provided substantially for the whole of its periphery except where the base F is positioned, with side flanges H, and screwing through these flanges and into the side walls D are cap-screws I which secure these parts together.

J and K are side walls of the cylinders B and C, and integrally-formed with these side walls, as well as with the side walls D are castings L and N which are chambered to form the compression-chests O and P. The ring-plate Q of each cylinder B and C is integrally formed with the side walls thereof.

2 and 3 are the cylinder plates for the cylinders B and C, and these plates are secured by the cap-screws 4 to their respective bases 5 and 6. The nuts and bolts designated by the common numeral of reference 7 secure the cylinder plates 2 and 3 to the flanges 8 of the ring-plates Q.

9 is any suitable packing positioned between certain parts of the engine-casing to prevent leakage.

10 is the base-plate, and the bases 5, F and 6 are secured to said base-plates by the nuts and bolts designated by the common numeral of reference 11.

Mounted within each of the cylinders A, B and C is a rotary piston 12, 13 and 14. 15 is the engine-shaft to which each of the said pistons is keyed, and this engine-shaft has bearing in the cylinder-plates 2 and 3, as well as in the various side walls already mentioned.

16 is the carbureter, and the same is secured by the nipple 17 in the top of the compression cylinder A.

18 is a spring-controlled intake-valve of any ordinary type, and the same controls the passage of air and fuel from the carbureter 16 into the compression-cylinder A, as will be understood.

19 is a cap closing one end of the carbureter 16.

Formed in the upper portion of each ring-plate Q and E is a recess or chamber 20, 21 and 22 which communicate respectively with the cylinders B, A and C. Mounted to operate in each of the said chambers are abutments 23, 24 and 25. These abutments are keyed to the valve-rod 26 which has bearing in the cylinder-plates and the side walls already mentioned. The normal position of the said abutments is illustrated in the drawings. Formed in the chest-casting L is a port 260 which opens into the compression-chest O. The mouth 27 of said port opens from the compression cylinder A behind the abutment 24 therein. Controlling the port 26 is a valve-head 28, the stem 29 of which has bearing in the extension 30 of the chest casting L.

31 is a shoe carried by the stem 29.

32 is a valve-head which controls the port 33 formed in the chest-casting L, and leading from the compression-chest O to the chamber 20 of the cylinder B and in front of the abutment 23.

34 is the valve-stem of the valve 32 and the same has bearing in the extension 35 of the chest-casting L.

36 is a shoe carried by the valve-stem 35.

Each valve-stem 29, and 34 is of course provided with the usual spring 37, as will be understood which normally keeps the said valve-heads against their seats.

As before described, each piston is provided with two wings positioned at an angle of 180 degrees to each other. The said wings are all in alinement, and therefore the wings of the various sets pass simultaneously underneath their associated abutments.

40 and 39 are the wings carried by the piston 12. These wings, as well as the wings of the other pistons, project beyond the perimeter of each piston, thus forming two annular spaces one on each side of the said wings, and bounded by the perimeter of each piston and the internal surfaces of the cylinders in which these pistons operate. As shown in the drawings, the said wings have an easy fit against the inner surface of each cylinder. As before described, when one of the wings of the piston 12 is drawing a charge from the carbureter 16, the other wing is compressing a charge of explosive mixture into either of the compression-chests O and P. In the position of the parts illustrated in Figs. 2, 3 and 4, the igniter "a" of the compression-chest O has ignited the explosive mixture therein, and the cam "b" keyed to the shaft 15 has, through the medium of the shoe 36, opened the valve 32, thus permitting the exploding charge of explosive mixture to pass through the port 33 and into the recess or chamber 20 of the cylinder B. The explosive mixture will drive the piston 13 around in the direction indicated by the arrow through the medium of its wing 38, thus developing power. Simultaneously with the operation just described, the wing 39 of the piston 12 is drawing in a new charge from the carbureter 16 into the compression cylinder A, and the wing 40 of this piston will be forcing a charge of explosive mixture from the annular chamber 300 through the port 41 (which is a duplicate of the port 260) leading from the compression-chamber A into the compression-chest P. Simultaneously with the operations just described, the port 26 is closed by the valve 28 and the port "l" is closed by the valve "k", and the cam "c" keyed to the shaft 15 contacts with the shoe "d" of the valve stem "e" and moves the valve-head "f" to open the port 41. As the piston 13 is being moved, the wing 42 thereof is driving the waste products of combustion from the annular chamber 301 of the cylinder B through the exhaust port 43. By means hereinafter described, the various abutments 23, 24 and 25 are operated in due course, and consequently the various wings carried by the pistons are permitted to pass thereby, when the said abutments are closed. After the wing 42 has forced the waste products of combustion through the exhaust port 43 and has passed by the open abutment 23, the said abutment is closed, and as the said wing 42 continues its movement, the air-valve 44 mounted in the ring-plate Q of the cylinder B is opened, thus permitting the said wing 42 to draw into the cylinder B a charge of fresh cold air which is chiefly used for cooling the cylinder. In due course the cams "*b*" and "*c*" move out of contact with the shoes 36 and "*d*", thus causing the valves 32 and "*f*" to be closed, and the explosive mixture compressed in the compression-chest P will be ignited so that one of the wings carried by the piston 14 will receive the impact of the explosion and develop power. Simultaneously with the firing of the explosive mixture by the igniter "*g*" in the compression-chest P, the cam "*h*" keyed to the shaft 15 is in contact with the shoe "*i*" of the valve-stem "*j*" and moves the valve-head "*k*" so as to open the port "*l*" leading from the compression-chest P to the chamber 22 of the cylinder C. Simultaneously with the movement described, the cam "*m*" keyed to the shaft 15 is operating the valve-head 28 through the medium of its stem 29 and shoe 31 and opened the port 26, thereby permitting the wing 39 of the piston 12 to compress a charge of explosive mixture into the compression-chest O. When this operation is complete, the charge is ignited as before described.

From the foregoing part of this specification it is clear to one skilled in this art that there are two explosions to each revolution of the cylinders. When one of the wings of the pistons 13 is receiving the explosion in the cylinder B, one of the wings of the piston 14 is cleaning out the waste products of combustion from the cylinder C through the exhaust port 201 thereof. When the piston 12 is drawing a fresh charge of explosive mixture from the carbureter 16, it is compressing a charge into one of the compression-chests O and P. When one of the valves, controlling the passage of explosive mixture from the compression-chests into the power-developing cylinders, is open, the valve in the other compression-chest is opened which controls the passage of explosive mixture from the compression-cylinder into the said other compression-chest.

Keyed to the shaft 15 adjacent the cylinder plate 3 is a sleeve 45 provided with a pair of cams 46 and 47 positioned substantially at an angle of 180 degrees to each other.

48 is a lever pivoted by the pin 49 to the cylinder-plate 3. The cam 47 is resting in the notch 50 of the lever 48. Before the wing 40, for example, of the piston 12, reaches the abutment 24, the cam 46 shall have come in contact with the lip 51 of the lever 48 and moved this lever upward around its pin 49. The lever 48 is connected by a link-rod 52 with an arm 53 which is keyed to the valve-rod 26, and therefore the abutment 24, together with the other abutments, will be moved into its associated chamber or recess 21, to permit the free passage of the wing 40. Immediately the said wing has passed far enough to be out of the path of movement of the abutment 24, the cam 46 has been moved into the position occupied by the cam 47, and as the lever 48 is partly controlled by the spring 54 connected thereto and to the pin 55, through the before described parts, the said abutments are returned to normal position in plenty of time to permit the other functions to be performed.

56 is a pin carried by the cylinder-plate 3 against which the lever 48 normally rests. This pin prevents undue wear of the cams 46 and 47 and lever 48.

Each time the abutments 23 and 25 are returned to normal position, the intake valves 44 and 57, leading respectively into the cylinders B and C, are operated so as to permit the recesses or chambers 20 and 22 to be filled with fresh air before the explosion takes place in the proper compression-chest, as before set forth.

Through one side of the ring-plate E, that side against which the explosive mixture is under compression by one of the wings of the piston 12, I construct a plurality of holes 58. In the center hole I screw the stem 59, and I pass over this stem a plate 60 which is wide enough, to cover over the unplugged holes 58.

61 is a nut screwing on the outer end of the stem 59, and mounted on this stem, and between the plate 60 and the nut 61, is a coiled spring 62 which normally keeps the plate 60 in position. In case of any back firing, the plate 60 will yield and permit the necessary exhaust. The ends of the plates 60 are quite close to the flanges H of the side walls D, and therefore the said plate cannot be shifted to accidentally uncover the holes 58.

In order to regulate the speed of the engine, I provide the compression cylinder with a governor constructed as follows, though any other suitable form of governor may be used in place of the one I am about to describe: Screwing into a hole 63 formed in the ring-plate E and extending into the chamber 21, is a tubular casing 64 in which operates a pin 65 the lower end of which rests in a pocket 66 formed in the abutment 24. 67 is a cap screwing over the outer end of the tubular casing 64, and mounted within this tubular casing between the cap 67 and the inner end of the pin 65 is a coiled spring 68 which exerts pressure against this pin and keeps it in place against the abutment 24. By means of the cap 67 the head of which extends beyond the outer end of the tubular casing 64, the pressure exerted by the spring 68 against the pin 65 can be regulated so as to govern the speed of the engine.

The governor just described will of course coact with the spring 54 in maintaining the abutments 23, 24 and 25 in closed position.

By means of the governor just described, or its equivalent, the abutment 24 is normally held closed so that I am enabled to compress the full charge of the explosive mixture within the compression-cylinder proper and pass the whole of this charge into either of the compression-chests, by means of one of the wings of the piston 12, when the engine is operating at a given number of revolutions per minute. For instance, if the pistons of the engine be revolving at the rate of 100 revolutions per minute, the compression within the compression cylinder A will not be strong enough to open the abutment 24 against the pressure of the spring 68 exerted by the pin 65 thereagainst, but the complete charge will be freely passed through either of the outlets 27 and ports 260 or 41 into one of the compression-chests O or P. If the speed of the engine reaches 105 revolutions per minute, the increased compression of the explosive mixture will cause the abutment 24 to open against the spring-held pin 65 to a greater or lesser extent by reason of the inability of the mixture to pass through the opened outlets 27 with sufficient rapidity, and so permit part of the charge to escape beyond this abutment into the chamber 21 and the other part of the compression cylinder in front of the wing compressing the charge. It therefore follows that when the speed is increased as mentioned, there will be less explosive mixture in the next charge forced into either of the compression-chests, and therefore the power developed therefrom will not be as great as that developed from a full charge, and consequently the speed of the engine will in due course slow down to the required speed. By the opening of the abutment 24 as described, it will be understood that although the speed of the engine may momentarily increase, still the pressure within the compression-chests will not go above a given amount. The abutment 24 will produce the same effect as a throttle valve and with the result that the speed of the engine will be reduced at certain times.

The base-plate 10 is provided with a rib 100 which fits into a slot 101 formed in the base of each ring-plate in order to keep the said cylinders all in alinement at their bottom portions.

In Fig. 3 the relative positions of the discharge ends of the ports 33 and 27 in respect to the abutment 23 are indicated in dotted lines, and in Fig. 5 the relative position of the port 27 in respect to the port 33 is also indicated in dotted lines. Each ring-plate is provided with a shoulder 110 which fits into a notch 111 formed in the underside of each abutment, thereby forming a stop for said abutments. The nose 112 of each abutment rests in contact with the circular perimeter of each piston and it will of course be understood that said abutments extend for the full width of the cylinders and chambers in which they operate, and have close enough contact with these parts to permit of the minimum amount of leakage thereby, without any danger of binding.

Each compression-chest is provided with a plug 200 by means of which the seats for the valves 32 and "$k$" may be reached.

While I have described what I consider to be the best embodiment of my invention, I desire it to be understood that the principles can be embodied in different forms and I desire not to be limited beyond the requirements of the prior art and the terms of my claims.

What I claim as my invention is:

1. A rotary engine comprising a compression-cylinder; a rotary piston mounted therein provided with two wings spaced apart, and projecting beyond the perimeter of said piston; a power-developing cylinder provided with an exhaust port; a rotary piston mounted in said power-developing cylinder provided with two wings spaced the required distance apart, and projecting beyond the perimeter of said piston; the wings carried by said pistons being in alinement; a shaft common to said pistons; an abutment mounted in a recess formed in each of the said cylinders; a stem common to said abutments; a compression-chest intermediate said cylinders and connected with each of the said cylinders by a port, the port leading into said compression cylinder opening thereinto behind the abutment therein, and the port leading to said power-developing cylinder opening thereinto in front of said abutment; a valve mounted to control the passage of fuel through each of the said ports; valve-gear carried by said shaft and operating said valves alternately; an intake valve for said power-developing cylinder opening thereinto in front of the abutment therein; a carbureter communicating with said compression-cylinder in front of said abutment therein, and means actuated by said shaft for operating said abutments, as set forth and for the purpose specified.

2. A rotary engine comprising a compression-cylinder; a piston mounted therein provided with two wings spaced apart, and projecting beyond the perimeter of said piston; a power-developing cylinder provided with an exhaust port; a rotary piston mounted in said power-developing cylinder, provided with two wings spaced the required distance apart, and projecting beyond the perimeter of said piston; a shaft common to said pistons; an abutment mounted in a recess formed in each of the said cylinders; a stem common to said abutments; a compression-chest intermediate said cylinders and connected to each of the said cylinders by a port, the port leading into said compression-cylinder opening thereinto behind the abutment therein, and the port leading to said power-developing cylinder opening thereinto in front of said abutment; a valve mounted to control the passage of fuel through each of the said ports; valve-gear carried by said shaft and operating said valves alternately; an intake valve for said power-developing cylinder opening thereinto in front of the abutment therein; a carbureter communicating with said compression-cylinder in front of said abutment therein; means actuated by said shaft for operating abutments, and a governor controlling the movement of the abutment mounted in said compression-cylinder.

3. A rotary engine comprising a compression cylinder; a rotary piston mounted therein provided with two wings spaced apart, and projecting beyond the perimeter of said piston; a power-developing cylinder provided with an exhaust port; a rotary piston mounted in said power-developing cylinder, provided with two wings spaced the required distance apart, and projecting beyond the perimeter of said piston; a shaft common to said pistons; an abutment mounted in a recess formed in each of the said cylinders; a stem common to said abutments; a compression-chest intermediate said cylinders and connected to each of the said cylinders by a port, the port leading into said compression-cylinder opening thereinto behind the abutment therein, and the port leading to said power-developing cylinder opening thereinto in front of said abutment; a valve mounted to control the passage of fuel through each of the said ports; valve-gear carried by said shaft and operating said valves alternately; an intake valve for said power-developing cylinder opening thereinto in front of the abutment therein; means actuated by said shaft for operating said abutments, and a spring-held plate carried by said compression cylinder and normally closing holes opening therefrom.

4. A rotary engine comprising a pair of power-developing cylinders each provided with an exhaust port; a rotary piston mounted in each of the said cylinders, and each provided with two wings spaced apart, and projecting beyond the perimeter of said pistons; a compression cylinder; a rotary piston mounted in said compression cylinder and provided with two wings spaced the required distance apart and projecting beyond the perimeter of said piston; the wings carried by said pistons being in alinement; a shaft common to said pistons; an abutment mounted in a recess formed in each of the said cylinders; a stem common to said abutments; a compression-chest intermediate each of the said power-developing cylinders and said compression cylinder, each compression-chest being provided with a pair of ports, one port from each compression-chest opening into said compression cylinder behind the abutment therein, and the other ports of said compression-chests opening each into its associated power-developing cylinder in front of the abutments therein; a valve mounted to control the passage of fuel through each of the said ports leading from said compression-chests; valve-gear carried by said shaft and operating simultaneously a valve in each compression-chest, as set forth; an in-take valve for each of the said power-developing cylinders opening thereinto in front of the abutments therein; a carbureter communicating with said compression cylinder in front of said abutment therein, and means actuated by said shaft for operating said abutments, as set forth and for the purpose specified.

5. A rotary engine comprising a pair of power-developing cylinders each provided with an exhaust port; a rotary piston mounted in each of the said cylinders, and each provided with two wings spaced apart, and projecting beyond the perimeter of said pistons; a compression cylinder; a rotary piston mounted in said compression cylinder and provided with two wings spaced the required distance apart and projecting beyond the perimeter of said piston; the wings carried by said pistons being in alinement; a shaft common to said pistons; an abutment mounted in a recess formed in each of the said cylinders; a stem common to said abutments; a compression-chest intermediate each of the said power-developing cylinders and said compression cylinders, each compression-chest being provided with a pair of ports, one port from each compression-chest opening into said compression cylinder behind the abutment therein, and the other ports of said compression-chests opening each into its associated power-developing cylinder in front of the abutments therein; a valve mounted to control passage of fuel through each of the said ports leading from said compression-chests; valve-gear carried by said shaft and operating simultaneously a valve in each compression-chest, as set forth; an in-take valve for each of the said power-developing cylinders opening thereinto in front of the abutments therein; a carbureter communicating with said compression cylinder in front of said abutment therein; means actuated by said shaft for operating said abutments, and a governor controlling the movement of the abutment mounted in said compression cylinder.

6. A rotary engine comprising a pair of power-developing cylinders each provided with an exhaust port; a rotary piston mounted in each of the said cylinders, and each provided with two wings spaced apart, and projecting beyond the perimeter of said pistons; a compression cylinder; a rotary piston mounted in said compression cylinder and provided with two wings spaced the required distance apart and projecting beyond the perimeter of said piston; the wings carried by said pistons being in alinement; a shaft common to said pistons; an abutment mounted in a recess formed in each of the said cylinders; a stem common to said abutments; a compression-chest intermediate each of the said power-developing cylinders and said compression cylinders, each compression-chest being provided with a pair of ports, one port from each compression-chest opening into said compression cylinder behind the abutment therein, and the other ports of said compression-chests opening each into its associated power-developing cylinder in front of the abutments therein; a valve mounted to control the passage of fuel through each of the said ports leading from said compression chests; valve-gear carried by said shaft operating simultaneously a valve in each compression-chest, as set forth; an in-take valve for each of the said power-developing cylinders opening thereinto in front of the abutments therein; a carbureter communicating with said compression cylinder in front of said abutment therein; means actuated by said shaft for operating said abutments, and a governor controlling the movement of the abutments mounted in said compression cylinder, and a spring-held plate carried by said compression cylinder and normally closing holes opening therefrom.

7. A rotary engine comprising a compression cylinder; a rotary piston mounted therein provided with two wings spaced apart and projecting beyond the perimeter of said piston; a power-developing cylinder provided with an exhaust port; a rotary piston mounted in said power-developing cylinder, provided with two wings spaced the required distance apart, and projecting beyond the perimeter of said piston; an abutment mounted in a recess formed in each of the said cylinders; a stem common to said abutments; a compression-chest intermediate said cylinders and connected to each of the said cylinders by a port, the port leading into said compression cylinder opening thereinto behind the abutments therein, and the port leading to said power-developing cylinder opening thereinto in front of said abutment; a valve mounted to control the passage of fuel through each of the said ports; valve-gear carried by said shaft and operating said valves alternately; an in-take valve for said power-developing cylinder opening thereinto in front of the abutment therein; a carbureter communicating with said compression cylinder in front of said abutment therein; a pair of cams mounted on one end of said shaft; a lever pivoted to one of said cylinders above said cams and provided with a lip; an arm keyed to the outer end of said valve stem, and a link rod connecting said lever with said arm, the whole being arranged to operate as set forth and for the purpose specified.

8. A rotary engine comprising a compression cylinder and two power-developing cylinders each provided with an intake port and with a constantly open exhaust port, each cylinder composed of a ring-plate provided with a base, and side walls positioned adjacent each side of the said ring-plates, and secured thereto; a base plate to which the said bases are secured; a casting at each side of said compression-cylinder and connected each with its associated power-developing cylinder, a compression-chest formed in each of said castings, said castings being each provided with a pair of ports opening from said compression-chests, one port from each of the said compression-chests opening into said compression-cylinder, and the other ports from said compression chests opening each into its associated power-developing cylinder; an abutment mounted in a recess formed in each of the said power cylinders and normally positioned so that the ports of said compression chamber will be behind the abutments and so that the in-take ports of said power-developing-cylinders will open thereinto in front of the said abutments; a stem common to said abutments; a valve mounted to control passage of fuel through each of the said ports opening into and from said compression-chests; valve-gear operated by said shaft and operating said valves alternately in pairs; an in-take valve for each of the said power-developing cylinders opening thereinto in front of the abutment therein; a carbureter communicating with said compression cylinder in front of the abutment therein, and means actuated by said shaft for operating said abutments, as set forth.

9. A rotary engine comprising a compression cylinder and two power-developing cylinders each provided with an intake port, and with a constantly open exhaust port, each cylinder composed of a ring-plate provided with a base, and side walls positioned adjacent each side of the said ring-plates, and secured thereto; a base plate to which the said bases are secured; a casting at each side of said compression cylinder and connected each with its associated power-developing cylinder, a compression-chest formed in each of said castings, said castings being each provided with a pair of ports opening from said compression-chests, one port from each of the said compression-chests opening into said compression cylinder, and the other ports of said compression chests opening each into its associated power-developing cylinder; an abutment mounted in a recess formed in each of the said cylinders and normally positioned so that the ports of said compression chamber will be behind thereof, and so that the in-take ports of said power-developing cylinder will open thereinto in front of the said abutments; a stem common to said abutments; a valve mounted to control the passage of fuel through each of the said ports opening into and from said compression-chests; valve-gear operated by said shaft and operating said valves alternately in pairs: an in-take valve for each of the said power-developing cylinders opening thereinto in front of the abutment therein; a carbureter communicating with said compression cylinder in front of the abutment therein; a governor comprising a tubular casing screwing into the ring-plate for said compression cylinder; a pin operating in said casing and having its lower end held in a notch formed in the abutment of said compression cylinder; an adjustable cap closing the outer end of said tubular casing, and a coiled spring mounted within said casing for the purpose of holding said pin against said abutment, as set forth.

In testimony whereof I have affixed my signature in presence of two witnesses.

HAVELOCK HARFORD.

Witnesses:
E. S. HOTCHKISS,
H. KAVANER.